United States Patent [19]

Maples

[11] 4,007,916
[45] Feb. 15, 1977

[54] GARDENING TOOL
[76] Inventor: Billy G. Maples, 65 Dale Road, Middletown, N.J. 07748
[22] Filed: Mar. 22, 1976
[21] Appl. No.: 668,708
[52] U.S. Cl. .................................................. 254/132
[51] Int. Cl.² ................................................ B66F 3/00
[58] Field of Search ................................... 254/132
[56] References Cited
UNITED STATES PATENTS

| 1,526,652 | 2/1925 | Wilson | 254/132 |
| 2,394,568 | 2/1946 | Stewart | 254/132 |
| 2,806,733 | 9/1957 | Hund | 254/132 |
| 3,282,567 | 11/1966 | Weniger | 254/132 |

Primary Examiner—Al Lawrence Smith
Assistant Examiner—Robert C. Watson
Attorney, Agent, or Firm—Henry J. Walsh

[57] ABSTRACT

There is disclosed a gardening tool for extracting weeds from a lawn and adapted to be used while standing erect including an elongated extendible cane shaped member on the base of which is affixed perpendicularly a lateral support running parallel to the ground and a pivotally mounted food operated pedal bar having an integrated soil cutter.

9 Claims, 5 Drawing Figures

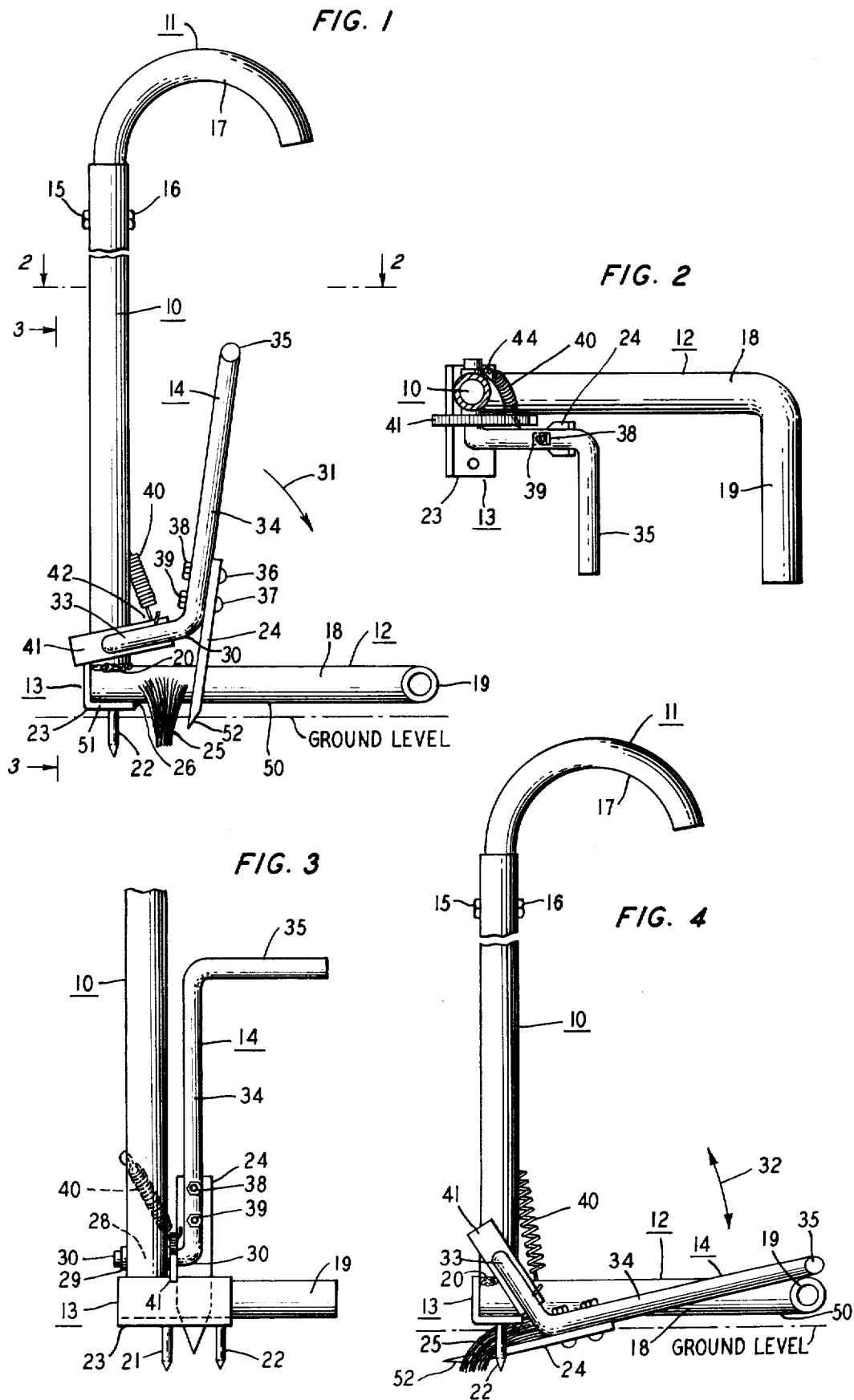

GARDENING TOOL

BACKGROUND OF THE INVENTION

This invention relates to gardening and farming equipment, and, more particularly, it concerns a tool for the selective removal of undesired growths and weeds.

Establishing and maintaining a weed-free lawn or garden is the consuming desire of almost every homeowner and gardener. It appears, however, that it is rarely achieved without resort either to the use of chemical plant killers or to much manual labor and digging. In more recent years, chemical use in gardening has been shown to have harmful side effects and serious ecological consequences. Moreover, the compromise chemical solutions such as broad-based herbicides, although easy to apply, are not completely effective. Small scattered clumps of weeds are left which, unless removed, can reseed next season.

Removal of weeds with a conventional hand-held digging device obviously involves frequent body bending, stooping and kneeling, that inevitably results in the rapid onset of fatigue and soreness. It is a primary object of this invention to eliminate such bending and stooping by providing a gardening tool which can be used while standing substantially erect. Moreover, the tool is capable of quickly and facilely removing most of the known varieties of weeds from a lawn or garden.

STATEMENT OF THE INVENTION

The foregoing object as well as others which are disclosed hereinafter are achieved in accordance with my preferred embodiment which comprises a device resembling a walking cane, at the bottom of which at ground level approximately, is attached a pivoted foot lever which is stepped upon to engage a weed for removal. The engaged weed is actually removed by tilting the cane handle backward (holding the foot lever engaged) while pivoting on a ground level lateral support. Thus, this embodiment employs a unique combination of levers, both foot and hand operated, that serve to precisely direct, concentrate and through the mechanical advantage of the combination, amplify the applied forces of the human effort. Importantly, the hand and foot operations are quite natural and follow a logical, but elementary sequence.

My "nit picker", as I refer to it, has an adjustable grip which easily compensates for the size of the user. Also, my device is arranged so that the "dagger shaped" tool which contacts the soil and engages the weed for removal, can be replaced easily, if required, due to wear or if a different shaped tool might prove more efficient in the removal of certain weeds in connection with other tasks.

BRIEF DESCRIPTION OF THE DRAWING

My invention is shown in detail in the enclosed drawing which comprise:

FIG. 1 depicting a side view of the tool and particularly the pivoted lever with a downwardly extending dagger shaped cutter;

FIG. 2 shows a sectional view taken along section line 2 of FIG. 1 showing a top view of the tool;

FIG. 3 shows a front view of the tool taken along section line 3 of FIG. 1 showing in some detail the placement of the cutter with respect to turf engagement spikes at the bottom thereof; and FIGS. 4 and 5 depict the action of the tool initially engaging a weed and subsequent dislodgement of the weed by a backward tilting motion of the tool.

DETAILED DESCRIPTION

Figure 5:
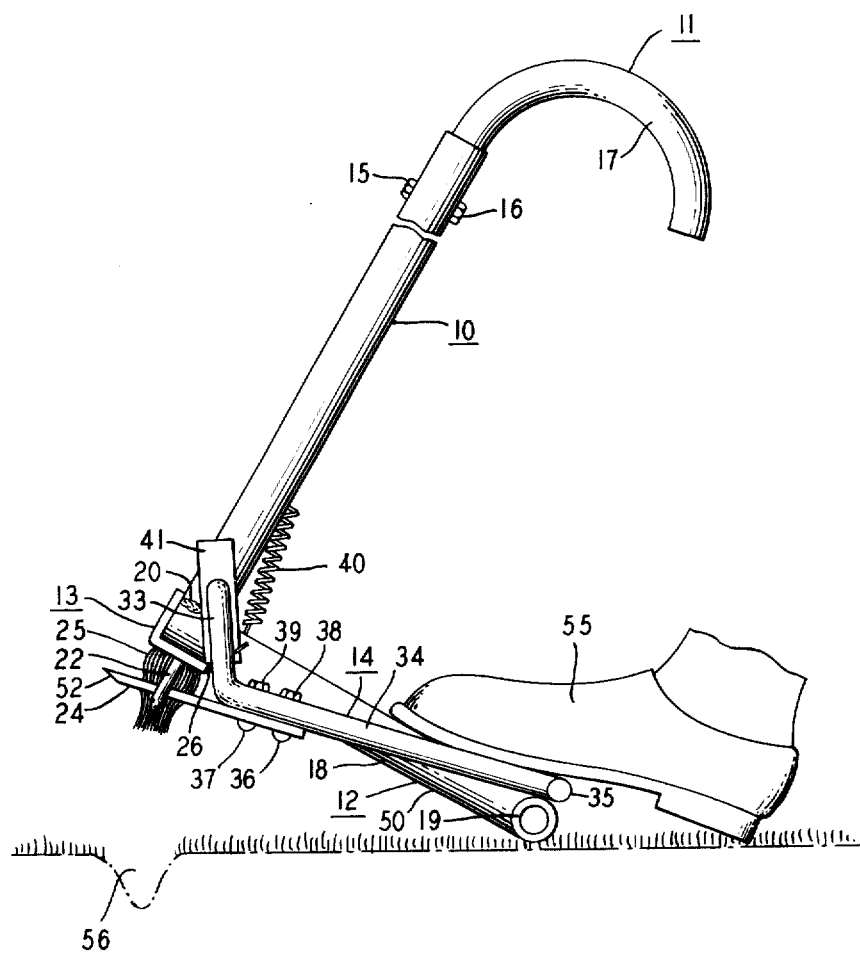

With reference generally to FIGS. 1 and 2, the tool may be generally divided into four basic sections which are the two-section vertical cane portions 10 and 11; the ground level lateral support 12, the turf-engagement spike assembly 13; and a foot pedal bar 14 pivotally mounted in the lower half section of cane portion 10. Considering the cane portions 10 and 11 first, they are constructed using two tubular shaped pieces. Portion 11 has an outer diameter which is slightly less the inner tubular diameter of portion 10 to accommodate a sliding fit engagement. At convenient locations in the lower section of portion 11, holes (not shown) are drilled through so that the overall length of the vertical cane sections can be adjusted to the height of the user. This is accomplished quite easily using bolt 15 and nut 16 which may be removed from portion 10 to allow for a realignment of holes (not shown) in portion 10 with the through-drilled holes of portion 11 and the replacement of bolt 15 and nut 16 to maintain the new adjustment. Cane portion 11, as may be appreciated in FIG. 1, has a curved upper portion 17 which is designed as a hand grip for the user much in the same way as a hand grip is provided on conventional walking canes.

Lateral support 12 is actually contiguous with cane portion 10 and can obviously be constructed numerous ways. As shown in FIGS. 1 and 2, it is constructed out of tubular stock and it generally comprises two portions 18 and 19 perpendicular to one another. In the arrangement depicted in the drawing, cane portion 10 is welded, as shown at weld 20, to support portion 18. Support 12 functions with the foot pedal bar (as will be described in more detail hereinafter) to furnish a rearward positioned lateral ground support for the foot pedal as it is depressed downwardly (FIG. 4), and a pivot (using portion 19) when the tool lifts an engaged weed (FIG. 5). The length of portion 18 which I have determined is optimum, is between 7 and 12 inches when working with lengths of portion 19 between 3 and 6 inches, respectively. In large measure the size of the lateral support 12 portions is controlled by the practical resolution of the weight of the entire assembly and the ease of the use which I have determined empirically through trial and error. The range and proportions given above, however, have proven most satisfactory in the models tested to date.

Turf engagement spike assembly 13 is best seen in FIGS. 2 and 3. It includes a pair of downwardly extending spikes 21 and 22 with pointed ends adapted to facilitate the ease of entry into the soil. Note in FIG. 3 that the spikes are offset from the vertical axis of cane portion 10 and that they are also spaced equidistant on either side of the vertical center line of cutter 24. The purpose of this design can be appreciated from a consideration of FIG. 4 which shows the cooperation of cutter 24 with spikes 21 and 22 in selecting and holding a weed 25. Assembly 13 also includes a section of right-angle stock 23 into which the tops of spikes 21 and 22 are anchored either by press fitting the tubular ends of spikes 21 and 22 or by welding. Stock 23 is also welded at weld 26 (FIG. 1) to a bottom surface of portion 18, thereby forming a unitary structure with lateral support 12 and vertical cane portion 10.

The operative structure of this tool is perhaps most centered on foot pedal bar 14 which, as shown in FIGS. 1 and 2, is pivotally mounted in aperture 28 (generally located in FIG. 3) in the lower section of cane portion 10. Aperture 28 is fitted with a bearing 29 through which a horizontal section 30 of pedal bar 14 is inserted to allow for rotational motion as indicated by arrows 31 (FIG. 1) and 32 (FIG. 4).

Pedal bar 14 is generally defined by an irregularly bent rod including the aforementioned section 30, as well as sections 33, 34 and 35, all of which may be best viewed in FIGS. 1 and 3. Each of the sections 30, and 33–35 are generally oriented at right angles to each adjacent section with the single exception of sections 33 and 34 which, as may be seen in FIG. 1, are oriented at an angle somewhat greater than 90°. End sections 35 and 30 are substantially parallel to each other.

Cutter 24 is fastened through a pair of apertures (not visible) to the lower section of pedal bar section 34 by bolts 36 and 37 and nuts 38 and 39. This fastening arrangement permits changes of the cutter 24 should it be required due to wear or for any other reason. Pedal bar section 34 is joined permanently to a rectangular shaped plate 41 which provides an aperture 42 through which one end of restoral spring 40 is fastened. The opposite end of spring 40 is coupled to spring fastener 44 on the lower section of cane portion 10 (best viewed in FIG. 2). As will appear from the following discussion, restoral spring 40 functions to return the pedal bar 14 to an upright position (FIG. 1) once it has been released from the weed engagement position (FIG. 4 or FIG. 5).

GENERAL OPERATION

It is opportune at this point after having carefully considered the structural aspects of the tool to consider its operation. For this purpose, we will consider FIGS. 1, 4 and 5, which when taken in that order, depict step-by-step the functioning of the tool. Assume it is desired to remove weed 25 from the surrounding lawn or garden. As a first step, position the tool as shown in FIG. 1 so that spikes 21 and 22 penetrate the turf just ahead of the weed and the tip portion of the cutter penetrates the turf behind weed 25. This is simply accomplished by grasping cane portion 11, lifting the tool, and placing lateral support 12 on the lawn. Note that ground level is somewhat below the bottom lateral support surfaces 50 and 51 and the spike or stud engagement assembly. This is natural because of the lawn grass which tends to lift the tool. The tool will, however, work equally well on bare ground as well as in a built-up lawn as will be readily apparent.

Having located the weed 25 properly, the next step is to actually place a foot on pedal section 35 while using the cane handle for support. Pressing lightly downward with the foot moves pedal bar 14 to the position shown in FIG. 4. More precisely, the pedal bar 14 pivots (rotates) about pedal bar section 30 and aperture 28 against the tension of spring 40 in the direction indicated by arrow 32. The pedal bar 14 is depressed until it comes into a resting position with pedal bar section 35 atop lateral support portion 19 as shown to the lower right-hand side of FIG. 4. As the pedal bar 14 is rotated downward the tip of cutter 24 scoops up the root and "dirt ball" associated with weed 25 capturing the entity as shown in FIG. 4. Spikes 21 and 22 which are embedded into the soil hold the entire assembly from slipping rearward during the time cutter 24 is scooping up the root ball. The tip of cutter 24 (sharp point) during this transition makes a cutting arc through the soil. Beveled surface 52 of cutter 24 is shaped to facilitate the passage of cutter 24 through the soil. It wil be apparent at this point that the shape of cutter 24 may be varied, as for example, to a spoon shape to perhaps widen the cut if that appears desirable. These modifications, however, are considered to be within the scope and spirit of this invention and have not been disclosed in detail herein for the sake of brevity and to improve our focus upon the actual inventive structure.

The third and final step in removing the undesired weed will now be considered with the aid of FIG. 5. After cutter 24 is engaged under spikes 21 and 22 (FIG. 4) a major section of the root structure has been severed, but many of the lateral roots remain intact. The third step dislodges these roots and the nucleus of the weed in one upward pull. This is particularly useful when dealing with clover and crabgrass which are known to have large lateral growths. As seen in FIG. 5, the mass of weed 25 is lifted by tilting back (toward the user) the cane handle while keeping foot 55 on top of pedal bar 14 so as to maintain engagement of weed 25 within spikes 21 and 22. The shape of the hole 56 which remains after weed removal is an approximation of the arc traveled by cutter 24 as it cuts through the soil.

By removing the foot 55 from the pedal bar 14, weed 25 is released and drops to the soil or lawn. As the foot is removed spring 40 reacts and pulls pedal bar 14 back to the normal position shown in FIG. 1, and hence it is repositioned for removal of another weed. Advantageously, the tool is largely self-cleaning because, upon removal of cutter 24 from under the weed, spikes 21 and 22 only engage weed 25 and it slips to the ground.

It should be clearly understood that this tool makes maximum advantage of known principles of mechanical leverage to reduce the workload concentration. For example, when cutter 24 is forced into the soil to engage weed 25 and to entomb weed 25 within the fingers of spikes 21 and 22, force is applied at the end of pedal bar 14. Comparison of the arc length of the travel of pedal bar 14 with the much shorter distance traveled by the cutter 24 is one example. Another is shown in FIG. 5, where the entire length of cane portions 10 and 11 gives added leverage to the task of lifting weed 25 with its lateral growth free of soil.

What is claimed is:

1. A gardening tool adapted both for hand and foot operation to extract undesired growths from soil comprising,
    a downwardly positioned extendible caneshaped member having a curved portion suitable for a hand grip,
    a lateral support affixed substantially perpendicular to said member near to the bottom thereof and forming a contiguous unit with said member,
    engaging studs affixed below said lateral support adapted to penetrate said soil, and
    a foot operated pivotally mounted pedal in a lower portion of said member having a downwardly posed detachable cutter affixed thereon.

2. The invention recited in claim 1 wherein said lateral support comprises two contiguous non-aligned tubular sections.

3. The invention recited in claim 1 further including a restoral device interconnecting said pedal with said member for maintaining said cutter downwardly posed.

4. The invention recited in claim 3 wherein said pedal comprises four contiguous tubular sections, end sections thereof being substantially parallel to each other, one of the midsections being connected to said restoral device, and said remaining section having said cutter affixed thereto.

5. An upstanding gardening implement comprising
a cane shaped tubular assembly including a fixed and an adjustable portion,
a lateral support member comprising two contiguous non-aligned sections lying in a plane which is substantially perpendicular to an axis of said fixed portion of said tubular assembly and being affixed thereto,
a turf engagement element including a pair of downwardly extending projections adapted for soil penetration,
a soil cutter, and
a foot operated pedal including four contiguous tubular parts one of which forms an axle pivotally mounted in said fixed portion and another section having mounted thereon said soil cutter.

6. The invention set forth in claim 5 wherein said adjustable portion includes a downwardly curved portion and a contiguous straight portion with adjustment apertures therein, and said straight portion being arranged for sliding interfit into said fixed portion.

7. The invention set forth in claim 5 wherein said element includes a mounting piece affixed to an underside thereof, and said projections comprise a pair of studs.

8. The invention set forth in claim 5 further including a spring connecting a third portion of said tubular part to said fixed portion of said tubular assembly.

9. A tool for removal of weeds from a lawn or garden operated manually and from an erect or standing position comprising,
a downwardly curved handle member having a straight portion with apertures therein,
an elongated tubular member into which said straight portion of said handle member interfits for adjustable connection therein via said apertures, said tubular member having a bearing aperture in the lower portion thereof, a lateral support member being affixed to said tubular member at the bottom thereof in such a fashion such that when said tubular member is substantially vertical said support member is approximately parallel to the lawn,
said lateral support means comprising two contiguous non-aligned tubular sections,
a turf engagement element comprising a mounting piece with a pair of downwardly extending spikes, said piece being a section of angular metal affixed to an underside of said lateral support member,
a foot operated pedal including four contiguous tubular portions one of which forms an axle which is pivotally mounted in said bearing aperture of said tubular member, and
a dagger-shaped cutter affixed to another tubular portion of said pedal and directed downwardly toward said lawn.

* * * * *